United States Patent
Li et al.

(10) Patent No.: US 11,340,748 B2
(45) Date of Patent: May 24, 2022

(54) LIGHT SOURCE MODULE AND TOUCH DEVICE

(71) Applicant: CHAMP VISION DISPLAY INC., Miaoli County (TW)

(72) Inventors: Hung-Ming Li, Miao-Li County (TW); Hui-Chi Chang, Miao-Li County (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 17/102,350

(22) Filed: Nov. 23, 2020

(65) Prior Publication Data

US 2021/0173502 A1  Jun. 10, 2021

(30) Foreign Application Priority Data

Dec. 6, 2019 (TW) ................................ 108144718

(51) Int. Cl.
*G06F 3/046* (2006.01)
*F21V 23/00* (2015.01)

(52) U.S. Cl.
CPC .............. *G06F 3/046* (2013.01); *F21V 23/00* (2013.01)

(58) Field of Classification Search
CPC .... G06F 3/046; F21V 23/00; G02F 1/133602; G02F 1/133603; G02F 1/1336
See application file for complete search history.

(56) References Cited

U.S. PATENT DOCUMENTS

| | | | |
|---|---|---|---|
| 7,780,312 B2 * | 8/2010 | Han | G02F 1/133611 362/235 |
| 2016/0048247 A1 | 2/2016 | Han et al. | |
| 2018/0321558 A1 * | 11/2018 | Hu | G02F 1/133605 |

FOREIGN PATENT DOCUMENTS

| | | | |
|---|---|---|---|
| CN | 104566277 | | 4/2015 |
| CN | 110083280 | | 8/2019 |
| EP | 2911043 | | 9/2018 |
| TW | M321154 | * | 10/2007 |

* cited by examiner

*Primary Examiner* — Lisa S Landis
(74) *Attorney, Agent, or Firm* — JCIPRNET

(57) ABSTRACT

A light source module having a light emitting surface is provided. The light source module includes at least one substrate, at least one circuit layer, and at least one light emitting element. The at least one circuit layer is disposed on at least one surface of the at least one substrate, and the at least one circuit layer includes at least one circuit. An orthogonal projection of the at least one circuit onto the light emitting surface forms a circuit region, and a coverage rate of the circuit region on the light emitting surface is less than 50%. The at least one light emitting element is disposed on the at least one surface of the at least one substrate and is connected to the at least one circuit layer. In addition, a touch device having the light source module is also provided.

10 Claims, 6 Drawing Sheets

LIGHT SOURCE MODULE AND TOUCH DEVICE

CROSS-REFERENCE TO RELATED APPLICATION

This application claims the priority benefit of Taiwan application serial no. 108144718, filed on Dec. 26, 2019. The entirety of the above-mentioned patent application is hereby incorporated by reference herein and made a part of this specification.

BACKGROUND

Technical Field

The invention relates to an optical module and an input device, and more particularly, relates to a light source module and a touch device.

Description of Related Art

Along with development of touch technology, a variety of products with touch input functions have gained increasing popularity in the consumer market. Touch display panels are applied not only to various personal electronic products (such as tablet computers, smart phones, etc.) but also to drawing boards used in the art designing and design field for implementing touch input through electronic styluses for drawing. The electronic styluses may be divided into an electromagnetic resonance (EMR) type and an active electrostatic solution (AES) type. An EMR electronic stylus may function based on the EMR technology without a battery or wire. Taking a drawing board equipped with a backlight module for example, its electromagnetic touch sensing layer is generally disposed below the backlight module, and in this way, the light emitted by the backlight module is prevented from being blocked by the touch sensing layer. However, under such arrangement, only an edge-type backlight module may be selected to be used in order to prevent the backlight module located above the touch sensing layer from interfering with or affecting electromagnetic induction between the touch sensing layer and an electronic stylus, which may cause an abnormal touch function. As demands for high-end drawing boards (such as high dynamic range imaging) grow, it can be seen that the edge-type backlight module can no longer satisfy the demands.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a light source module and a touch device in which electromagnetic induction between a touch sensing layer and an electronic stylus is prevented from being interfered or affected by the light source module.

Other objects and advantages of the invention may be further illustrated by the technical features broadly embodied and described as follows.

In order to achieve one or a portion of or all of the objects or other objects, an embodiment of the invention provides a light source module having a light emitting surface. The light source module includes at least one substrate, at least one circuit layer, and at least one light emitting element. The circuit layer is disposed on a surface of the substrate. The circuit layer includes at least one circuit (trace), and an orthogonal projection of the at least one circuit onto the light emitting surface forms a circuit region. A coverage rate of the circuit region on the light emitting surface is less than 50%. The light emitting element is disposed on the surface of the substrate and is connected to the circuit layer.

In an embodiment of the invention, a metal layer is not disposed on regions of the substrate and the circuit layer corresponding to a region outside the circuit region.

In an embodiment of the invention, a number of the light emitting elements is plural, and the light emitting elements are disposed on the surface of the substrate in an array.

In an embodiment of the invention, a wire diameter of each circuit is 0.1-2 mm.

In an embodiment of the invention, the circuit layer includes at least two circuits, and a space between two adjacent circuits in the at least two circuits is 0.2-2 mm.

In an embodiment of the invention, the substrate has at least one opening, and the at least one opening penetrates through the substrate from the surface to another surface.

In an embodiment of the invention, a number of the openings is plural, the circuit layer includes a plurality of circuits, and the circuits and the openings are arranged in an alternating manner.

In an embodiment of the invention, a number of the substrates is plural, a number of the light emitting elements is plural. The substrates are arranged at intervals, and each of the substrates carries at least one of the light emitting elements.

In order to achieve one or a portion of or all of the objects or other objects, an embodiment of the invention provides a touch device including a light source module and a touch sensing layer. The light source module has a light emitting surface. The light source module includes at least one substrate, at least one circuit layer, and at least one light emitting element. The circuit layer is disposed on a surface of the substrate. The circuit layer includes at least one circuit, and an orthogonal projection of the at least one circuit onto the light emitting surface forms a circuit region. A coverage rate of the circuit region on the light emitting surface is less than 50%. The light emitting element is disposed on the surface of the substrate and is connected to the circuit layer. The touch sensing layer and the light emitting element are respectively located at two opposite sides of the substrate.

In an embodiment of the invention, the touch device includes a display panel, and the light emitting element faces the display panel.

In an embodiment of the invention, the touch sensing layer is an electromagnetic touch sensing layer.

Based on the above, the embodiments of the invention have at least one of following advantages or effects. In the touch device and the light source module of the invention, the coverage rate of the orthogonal projection (i.e., the circuit region) of the circuit of the circuit layer in the light source module onto the light emitting surface of the light source module is designed to be less than 50%, so that a distribution area of the circuit is not excessively large. In this way, when the user performs touch input on the touch device by using an electronic stylus, thanks to the small distribution area, the circuit layer located between the electronic stylus and the touch sensing layer does not interfere the electromagnetic induction between the electronic stylus and the touch sensing layer.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
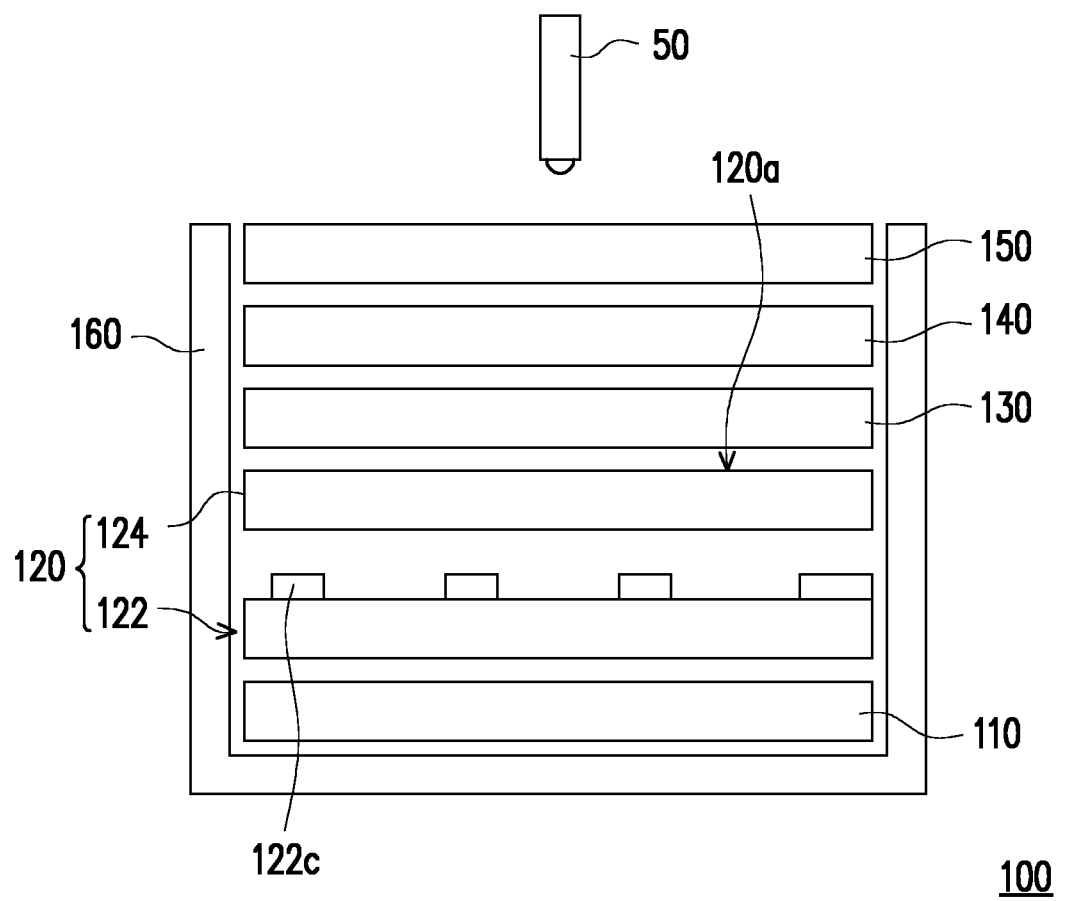
FIG. 1 is a schematic view of a touch device and an electronic stylus according to an embodiment of the invention.

FIG. 1 is a schematic view of a touch device and an electronic stylus according to an embodiment of the invention. Referring to FIG. 1, a touch device 100 of the embodiment includes a touch sensing layer 110, a light source module 120, an optical film set 130, a display panel 140, a light transmissive cover 150, and a frame 160. The touch sensing layer 110, the light source module 120, the optical film set 130, the display panel 140, and the light transmissive cover 150 are sequentially stacked in the frame 160 from bottom to top. The touch sensing layer 110 is, for example, an electromagnetic touch sensing layer. The light source module 120 has a light emitting surface 120a and emits light towards the display panel 140 from the light emitting surface 120a.

To be specific, the light source module 120 is a direct-type light source module and includes a light source assembly 122 and selectively includes a diffuser 124. The diffuser 124 is stacked on the light source assembly 122, and the light source assembly 122 is located between the diffuser 124 and the touch sensing layer 110. The light emitting surface 120a of the light source module 120 is, for example, an upper surface of the diffuser 124. In other embodiments, the light emitting surface may also be defined as another surface or a virtual surface that emits light in a region surrounded by the frame 160, such as an upper surface of the optical film set 130, an upper surface of the display panel 140, or an upper surface of the light transmissive cover 150. Particularly, the diffuser 124 is not limited to be a sheet material, and in the invention, a plate, a film, or a combination of a plurality of optical elements capable of diffusing light may all be regarded as the diffuser of the invention.

Figure 2:
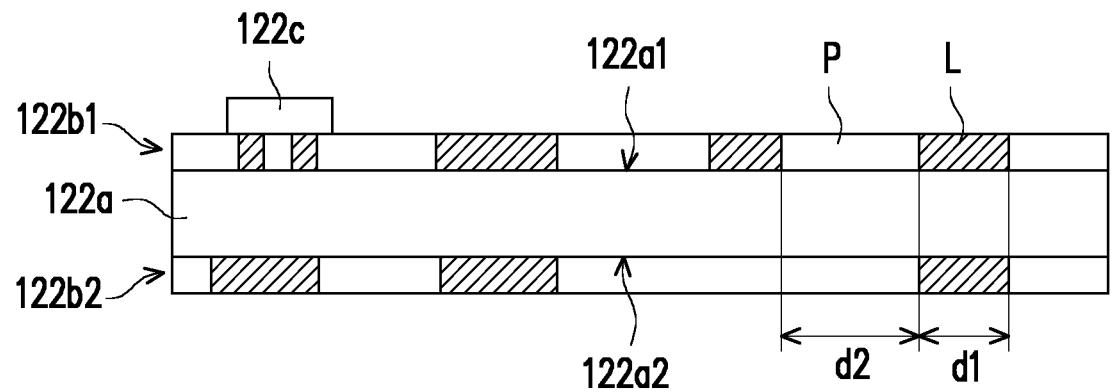
FIG. 2 is a schematic cross-sectional view of a light source assembly of FIG. 1.

FIG. 2 is a schematic cross-sectional view of the light source assembly of FIG. 1. Referring to FIG. 1 and FIG. 2, the light source assembly 122 of the light source module 120 includes at least one substrate 122a, circuit layers 122b1 and 122b2, and at least one light emitting element 122c. Particularly, the circuit layers 122b1 and 122b2 are provided in the embodiment, but the invention is not limited thereto. In other embodiments, only the circuit layer 122b1 or the circuit layer 122b2 is provided, or three or more circuit layers are be provided. For clarity's sake, only one light emitting element 122c is illustrated in FIG. 2. The circuit layers 122b1 and 122b2 are respectively disposed on two opposite surfaces 122a1 and 122a2 of the substrate 122a. The circuit layers 122b1 and 122b2 include all circuit traces, ground lines, and all metal layers (except the light emitting element 122c) in the light source assembly 122, such as power traces, signal traces, ground lines (GND or 0 volt), sheet metal layers, etc., but the invention is not limited thereto. Each of the circuit layers 122b1 and 122b2 includes at least one circuit (e.g., trace) L and selectively includes an insulation layer P (or referred to as a passivation layer). For example, the insulation layer P is disposed between the circuits L in FIG. 2, but the invention is not limited thereto. In other embodiments, the insulation layer P may cover each of the circuits L (not shown). The at least one light emitting element 122c is disposed on the surface 122a1 of the substrate 122a in an array, and is connected to the circuits L of the circuit layer 122b1, and a top surface (in the embodiment, the top surface is the light emitting surface) of the light emitting element 122c faces the display panel 140. The touch sensing layer 110 and the light emitting element 122c are respectively located at two opposite sides of the substrate 122a.

Figure 3:
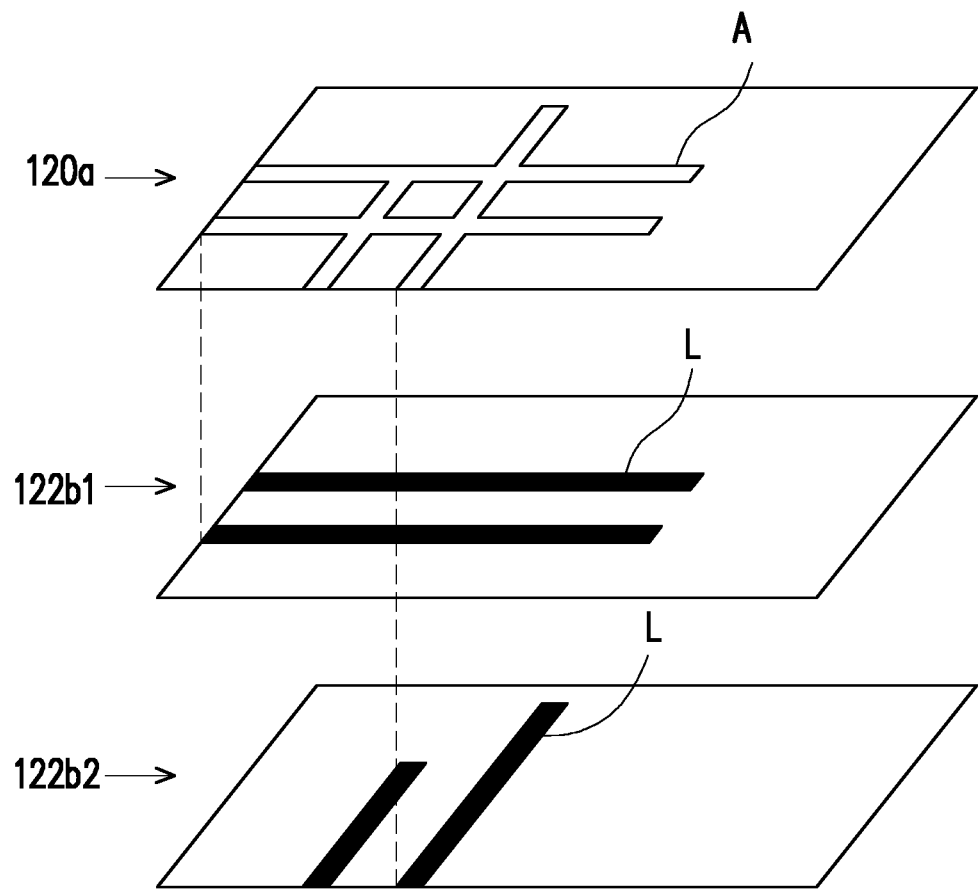
FIG. 3 is a schematic view of the light source assembly and a light emitting surface of FIG. 1.

FIG. 3 is a schematic view of the light source assembly and the light emitting surface of FIG. 1. For clarity's sake, FIG. 3 only schematically illustrates a part of circuits L of the circuit layers 122b1 and 122b2 and the light emitting surface 120a. Referring to FIG. 1 to FIG. 3, in the embodiment, an orthogonal projection of the at least one circuit L of the circuit layers 122b1 and 122b2 onto the light emitting surface 120a may be regarded as a circuit region A on the light emitting surface 120a. In the substrate 122a and in each layer structure of and the circuit layers 122b1 and 122b2, a metal layer is not provided to regions corresponding to a region outside the circuit region A. To be specific, within a projection range of the light emitting surface 120a, a metal layer and/or an electronic element is not provided to a region of the light source assembly 122 corresponding to the region outside the circuit region A, except for the light emitting element 122c. However, the invention is not limited thereto. In other embodiments, except for the light emitting element 122c, within the projection range of the light emitting surface 120a, a metal layer and/or an electronic element is not provided to a region between the display panel 140 and the touch sensing layer 110 (not including the display panel 140 and the touch sensing layer 110) corresponding to the region outside the circuit region A. As an unnecessary metal layer on the substrate 122a is removed, a coverage rate of the circuit region A on the light emitting surface 120a is less than 50%, preferably less than 25%, and more preferably less than 20%. For example a ground layer (e.g., an entire layer of a ground layer) of a general circuit board is not laid on the light source assembly 122 of this embodiment, so that a redundant metal layer is not provided on the substrate 122a, and the circuit layers 122b1 and 122b2 do not have an excessively large distribution area. Therefore, when the user performs touch input on the touch device 100 by using an electronic stylus 50, the metal layer located between the electronic stylus 50 and the touch sensing layer 110, for example, the circuit layers 122b1 and 122b2, does not interfere with electromagnetic induction between the electronic stylus 50 and the touch sensing layer 110 due to a small layout area (disposition area) of the metal layer. Moreover, an unnecessary metal layer is not provided on the substrate 122a that may interfere with the electromagnetic induction. Particularly, in other embodiments, when an electromagnetic induction effect between the electronic stylus 50 and the touch sensing layer 110 is not affected, the ground layer may be selectively disposed. For example, the ground layer may be disposed in a peripheral region of the substrate 122a, but the invention is not limited thereto.

Figure 4:
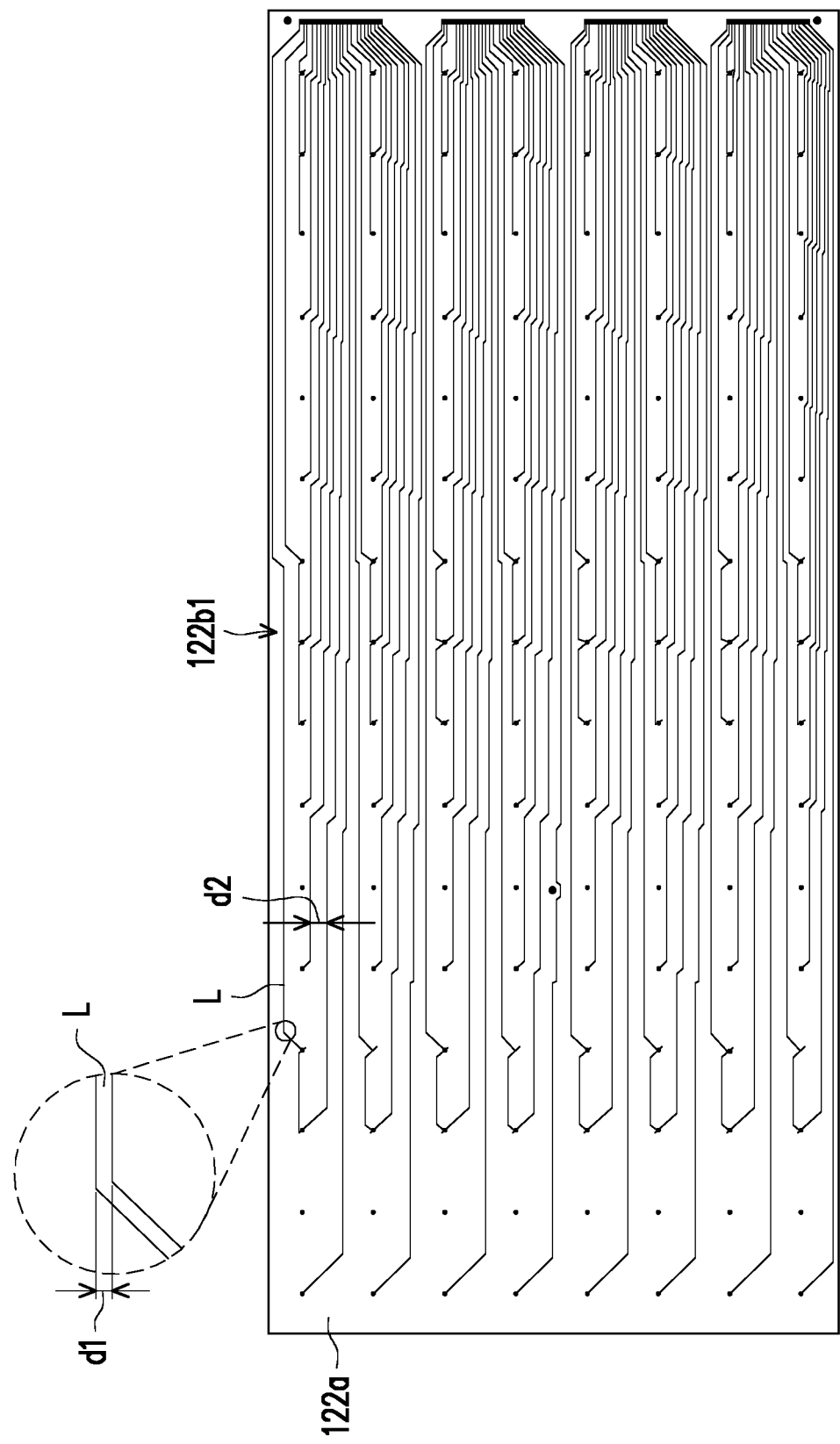
FIG. 4 is a top view of a substrate and circuit layers of FIG. 2.

FIG. 4 is a top view of the substrate and the circuit layers of FIG. 2. Referring to FIG. 2 and FIG. 4, the circuit layers 122b1 and 122b2 of the embodiment include at least one circuit L (a plurality of circuits L are illustrated). A wire diameter d1 of each circuit L may be, for example, 0.1-2 mm or 0.15-0.4 mm, but the invention is not limited thereto. A space d2 between two adjacent circuits L in the circuits L is, for example, 0.2-2 mm or 0.2-0.5 mm, so that the circuit layers 122b1 and 122b2 have a small layout area as described above. For example, the wire diameter d1 of a main power supply trace may be, for example, 1 mm or 0.4 mm, and the maximum wire diameter d1 of a ground line may be, for example, 2 mm or 0.4 mm, but the invention is not limited thereto. Particularly, a ground layer (e.g., an entire layer of a ground layer) of a general circuit board is not disposed on the light source assembly 122 of the invention, and only the ground line with the wire diagram d1 is provided.

Figure 5:
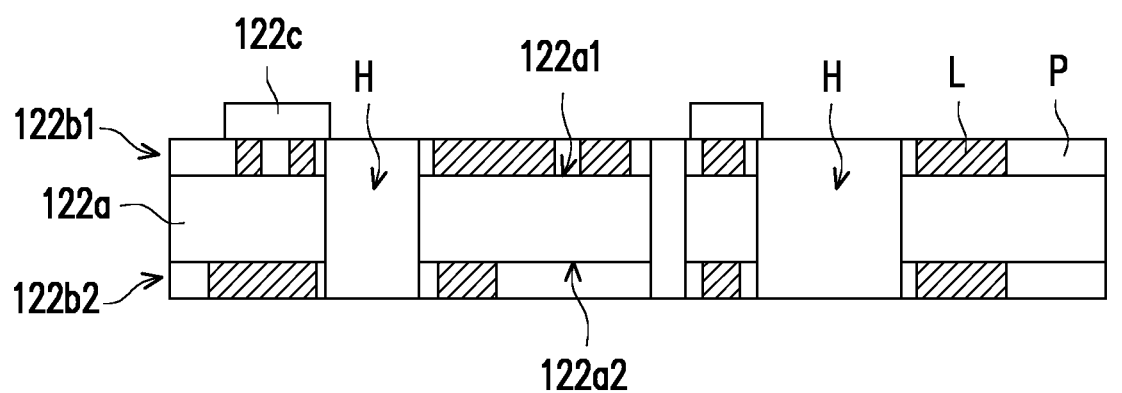
FIG. 5 is a schematic cross-sectional view of a light source assembly according to another embodiment of the invention.
Figure 6:
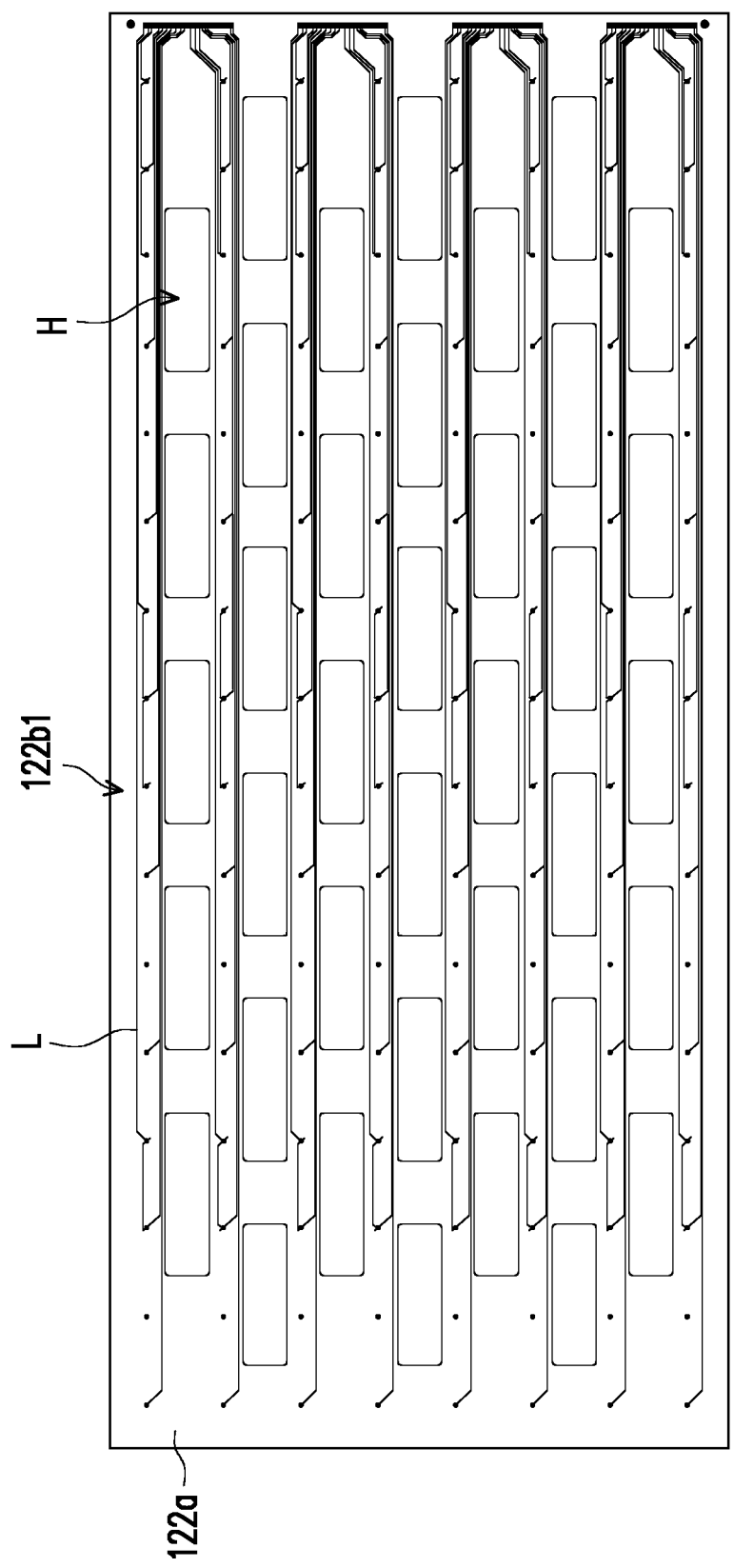
FIG. 6 is a top view of a substrate and a circuit layer of FIG. 5.

FIG. 5 is a schematic cross-sectional view of a light source assembly according to another embodiment of the invention. FIG. 6 is a top view of a substrate and a circuit layer of FIG. 5. A difference between the embodiment of FIG. 5 and FIG. 6 and the aforementioned embodiment is that in a light source assembly 122A shown in FIG. 5 and FIG. 6, a substrate 122a has at least one opening H (a plurality of openings are illustrated), and the opening H penetrates through the substrate 122a from a surface 122a1 of the substrate 122a to another surface 122a2 of the substrate 122a, and the circuits L and the openings H are arranged in an alternating manner. For example, some of the openings H are located between two circuits of the circuits L, and an area of orthogonal projections of the openings H onto a light emitting surface 120a (as shown in FIG. 1) is greater than or equal to an area of the circuit region A, so that the openings H are evenly arranged on the substrate 122a. As the openings H are formed on the substrate 122a, a physical area of the light source assembly 122A may be reduced, so that the electromagnetic induction between the electronic stylus 50 and the touch sensing layer 110 is prevented from being attenuated caused by blocking of the light source assembly 122A. A shape of the opening H in the embodiment is rectangular (oblong) as shown in FIG. 6, but the invention is not limited thereto, and the shape of the opening H may be circular or other suitable shapes.

Figure 7:
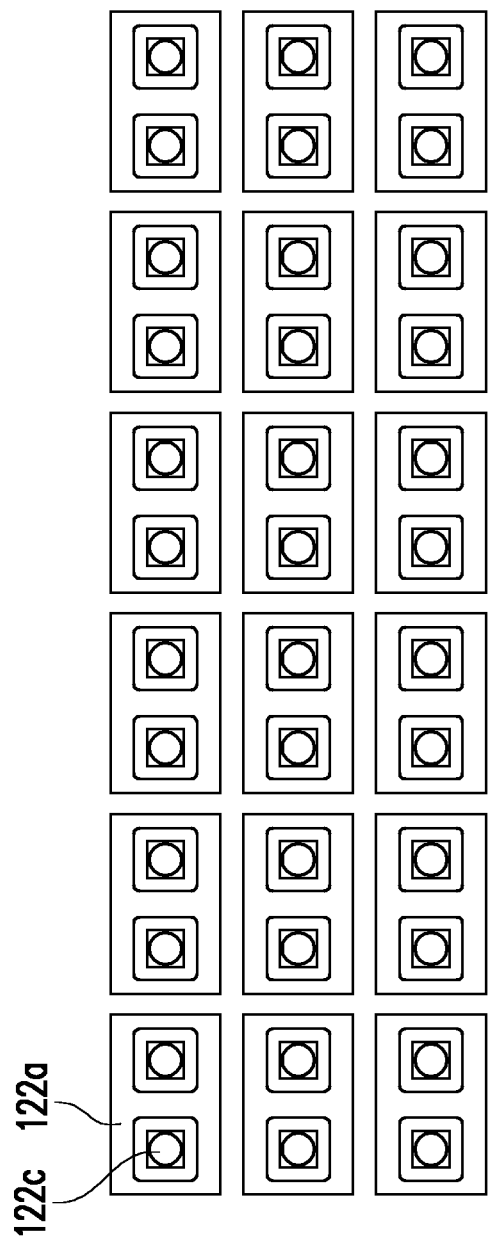
FIG. 7 is a schematic top view of substrates and light emitting elements according to another embodiment of the invention.

FIG. 7 is a schematic top view of substrates and light emitting elements according to another embodiment of the invention. A difference between the embodiment of FIG. 7 and the aforementioned embodiments is that in a light source assembly 122B of FIG. 7, a number of the substrates 122a is plural, and the substrates 122a are arranged at intervals. Each of the substrates 122a carries at least one light emitting element 122c (two light emitting elements are illustrated). Based on such configuration, a physical area of the light source assembly 122B may be reduced thanks to gaps among the substrates 122a, so that the electromagnetic induction between the electronic stylus 50 and the touch sensing layer 110 is prevented from being attenuated caused by blocking of the light source assembly 122B.

In view of the foregoing, the embodiments of the invention have at least one of following advantages or effects. In the touch device and the light source module of the invention, the coverage rate of the orthogonal projection (i.e., the circuit region) of the circuits of the circuit layers in the light source module onto the light emitting surface of the light source module is designed to be less than 50%, so that the distribution area of the circuits is not excessively large. Moreover, in the substrate and in each layer structure of the circuit layers, a metal layer is not provided to regions corresponding to a region outside the circuit region, so that a redundant metal layer is not provided on the substrate. In particular, a large-area ground layer of a general circuit board is not arranged (a large-area ground layer is generally disposed in a general circuit board, but such ground layer is not illustrated in a circuit diagram). In this way, when the user performs touch input on the touch device by using an electronic stylus, the circuit layers located between the electronic stylus and the touch sensing layer do not interfere with the electromagnetic induction between the electronic stylus and the touch sensing layer due to the small distribution area of the circuit layers. Moreover, an unnecessary metal layer that may interfere with the electromagnetic induction is not provided on the substrate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, having a light emitting surface, the light source module comprising:
    at least one substrate;
    at least one circuit layer, disposed on a surface of the at least one substrate, wherein the at least one circuit layer comprises at least one circuit, an orthogonal projection of the at least one circuit onto the light emitting surface forms a circuit region, and a coverage rate of the circuit region on the light emitting surface is less than 50%; and
    at least one light emitting element, disposed on the surface of the at least one substrate and connected to the at least one circuit,
    wherein a metal layer is not disposed on regions of the at least one substrate and the at least one circuit layer corresponding to a region outside the circuit region.

2. The light source module as claimed in claim 1, wherein a number of the at least one light emitting element is plural, and the light emitting elements are disposed on the surface of the at least one substrate in an array.

3. The light source module as claimed in claim 1, wherein a wire diameter of each of the at least one circuit is 0.1-2 mm.

4. A light source module, having a light emitting surface, the light source module comprising:
    at least one substrate;
    at least one circuit layer, disposed on a surface of the at least one substrate, wherein the at least one circuit layer comprises at least one circuit, an orthogonal projection of the at least one circuit onto the light emitting surface forms a circuit region, and a coverage rate of the circuit region on the light emitting surface is less than 50%; and
    at least one light emitting element, disposed on the surface of the at least one substrate and connected to the at least one circuit,
    wherein the at least one circuit layer comprises at least two circuits, and a space between two adjacent circuits in the at least two circuits is 0.2-2 mm.

5. A light source module, having a light emitting surface, the light source module comprising:
    at least one substrate;
    at least one circuit layer, disposed on a surface of the at least one substrate, wherein the at least one circuit layer comprises at least one circuit, an orthogonal projection of the at least one circuit onto the light emitting surface forms a circuit region, and a coverage rate of the circuit region on the light emitting surface is less than 50%; and
    at least one light emitting element, disposed on the surface of the at least one substrate and connected to the at least one circuit,
    wherein the at least one substrate has at least one opening, and the at least one opening penetrates through the at least one substrate from the surface to another surface.

6. The light source module as claimed in claim 5, wherein a number of the at least one opening is plural, the at least one circuit layer comprises a plurality of circuits, and the circuits and the openings are arranged in an alternating manner.

7. The light source module as claimed in claim 1, wherein a number of the at least one substrate is plural, a number of the at least one light emitting element is plural, the substrates are arranged at intervals, and each of the substrates carries at least one of the light emitting elements.

8. A touch device, comprising:
    a light source module, having a light emitting surface, the light source module comprises:
        at least one substrate;
        at least one circuit layer, disposed on a surface of the at least one substrate, wherein the at least one circuit layer comprise at least one circuit, an orthogonal projection of the at least one circuit onto the light emitting surface forms a circuit region, and a coverage rate of the circuit region on the light emitting surface is less than 50%; and
        at least one light emitting element, disposed on the surface of the at least one substrate and connected to the at least one circuit,
        wherein a metal layer is not disposed on regions of the at least one substrate and the at least one circuit layer corresponding to a region outside the circuit region; and
    a touch sensing layer, the touch sensing layer and the at least one light emitting element being respectively located at two opposite sides of the at least one substrate.

9. The touch device as claimed in claim 8, further comprising a display panel, wherein the at least one light emitting element faces the display panel.

10. The touch device as claimed in claim 8, wherein the touch sensing layer is an electromagnetic touch sensing layer.

* * * * *